United States Patent [19]
Karpisek

[11] Patent Number: 5,971,219
[45] Date of Patent: Oct. 26, 1999

[54] HOOD FOR DISCHARGING THE CONTENTS OF AN INVERTED CONTAINER

[76] Inventor: Ladislav Stephan Karpisek, 86 Woodfield Boulevarde, Caringbah, New South Wales 2229, Australia

[21] Appl. No.: 09/043,867
[22] PCT Filed: Aug. 1, 1997
[86] PCT No.: PCT/AU97/00491
  § 371 Date: Mar. 24, 1998
  § 102(e) Date: Mar. 24, 1998
[87] PCT Pub. No.: WO98/05565
  PCT Pub. Date: Feb. 12, 1998

[30] Foreign Application Priority Data

Aug. 2, 1996 [AU] Australia ................... PO1399

[51] Int. Cl.$^6$ .................................................. B67D 5/06
[52] U.S. Cl. ............................ 222/185.1; 222/460
[58] Field of Search ................. 222/185.1, 460, 222/325

[56] References Cited

U.S. PATENT DOCUMENTS

| | | | |
|---|---|---|---|
| 4,228,929 | 10/1980 | Gross | 222/185.1 |
| 4,247,021 | 1/1981 | Reiner et al. | 222/185.1 X |
| 5,441,321 | 8/1995 | Karpisek | 222/185.1 X |
| 5,445,289 | 8/1995 | Owen | 222/185.1 X |
| 5,702,034 | 12/1997 | Semenenko | 222/185.1 X |
| 5,860,566 | 1/1999 | Lucs | 222/325 X |

FOREIGN PATENT DOCUMENTS

| | | |
|---|---|---|
| 3247445 | 6/1984 | Germany . |
| 1539151 | 4/1988 | U.S.S.R. . |
| 2291038 | 1/1996 | United Kingdom . |

*Primary Examiner*—Kevin P. Shaver
*Attorney, Agent, or Firm*—Edwin D. Schindler

[57] ABSTRACT

A hood for mounting over the open top of a container for allowing the container to stand inverted on legs of the hood. The container's contents can then be discharged through the open top of the container and the hood chute. The hood includes a latching device for gripping the container and further includes movable sockets for engagement by a lifting device required to place the hood on, and remove the hood from, the container. Linkages connect the sockets with the latching device and movement of the sockets, as the hood is lifted by a hood lifting device, moves the latching device from a latching condition, which is so biassed by, for example, compression springs, to a release condition.

13 Claims, 4 Drawing Sheets

HOOD FOR DISCHARGING THE CONTENTS OF AN INVERTED CONTAINER

FIELD OF THE INVENTION

This invention relates to the discharge of containers.

BACKGROUND OF THE INVENTION

Many forms of container are used to house and transport dry flyable materials. Containers of the type which comprise a pallet or base to which is mounted four interlocked sides. Whilst this the invention has been devised with the above form of container particularly in mind it is not limited to such containers.

When containers have to be emptied the methods adopted depend to a large extent on the contents of the container. In the case of flowable material, such as granules, gravitational discharge would be possible. To facilitate this the container could have a bottom discharge port, however attempts to develop a suitable container have been less than totally successful.

An alternative is to tilt the container to an extent required to cause the contents to flow from the container. If uncontrolled discharge is not to occur the flow rate of the material has to be continually monitored and the tilt of the container adjusted to maintain a required discharge rate. This discharge method is labor and/or time intensive and is therefore not favored.

Another discharge method would be to mount a hood with a discharge opening fitted with a flow controlling device to the open top of the container and then support the container in an inverted condition. The challenge with this method is how to invert the container and support it in the inverted manner in the most efficient and economical manner. The present invention addresses this problem.

BROAD STATEMENT OF THE INVENTION

A hood for a container having four sides, a base and an open top; the hood includes a four sided frame with a seating end to sit on top edges of the four sides of a container at the open top of the container, legs on the frame extend away from the seating end of the frame, a discharge chute having a entry end and a smaller discharge end with the chute ends separated by a tapered chute body, the chute entry end is fixed to the hood frame adjacent the frame seating end and the chute body extends away from the frame seating end in the same direction as the frame legs, socket means on the hood frame to receive hood lifting means, said socket means being movable towards and away from the frame seating end between a working position and a rest position where the rest position is closer to said frame seating end than is said working position, latching means on the hood frame connected by linkage to the socket means, the latching means is movable between a latching condition to couple the hood to a container and a release condition and is biassed to the latching condition, the latching condition and the release condition of the latching means respectively correspond with the rest position and the working position of said socket means.

DETAILED DESCRIPTION OF THE DRAWINGS

Figure 1:
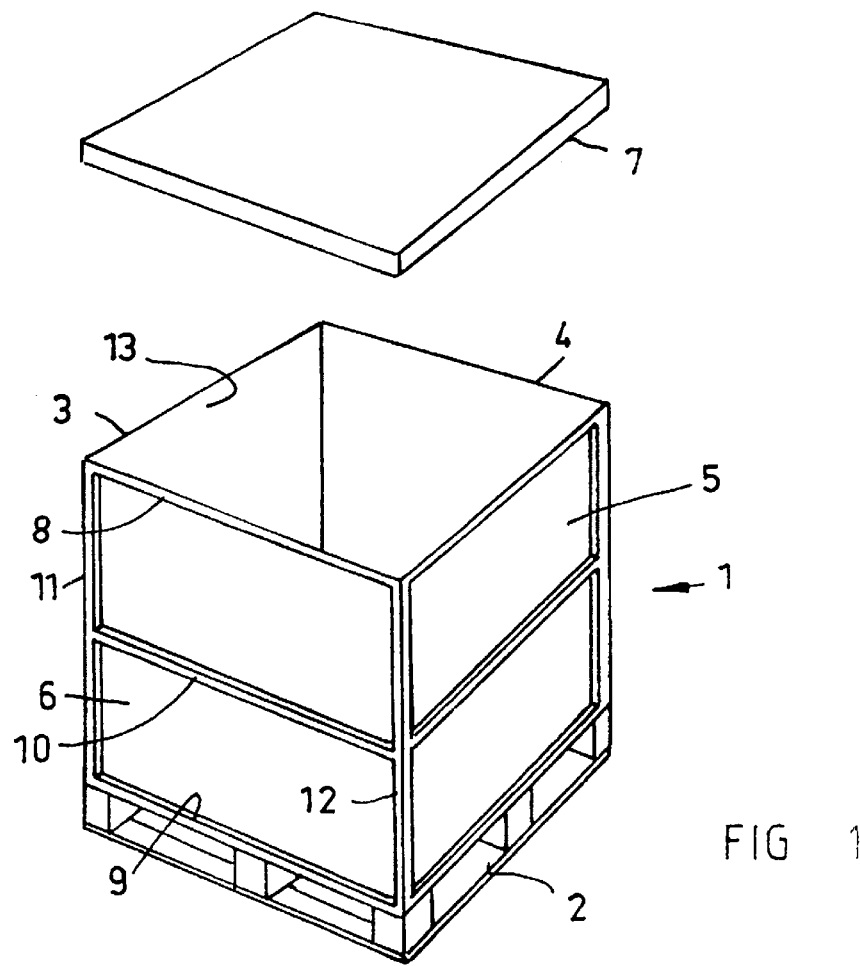
FIG. 1 is a schematic illustration of a container of the general form with which the hood of the present invention is intended to be used.

The container 1 of FIG. 1 comprises a base 2 with upstanding sides 3,4,5,6 which can be permanently erected on the base, or can be hinged to the base to allow the sides to fold down and overlie the base or can be demounted from the base. A lid 7 is normally provided for the container.

The sides 3 to 6 of containers of the above type are commonly constructed of a metal frame with a top rail 8, a bottom rail 9 and an intermediate rail 10 all end connected to frame uprights 11 and 12. The frame rails and uprights are conventionally made of tubular steel or angle iron. The frame of the container side is covered internally with a liner panel 13, commonly plywood or stiff sheet plastic.

Figure 2:
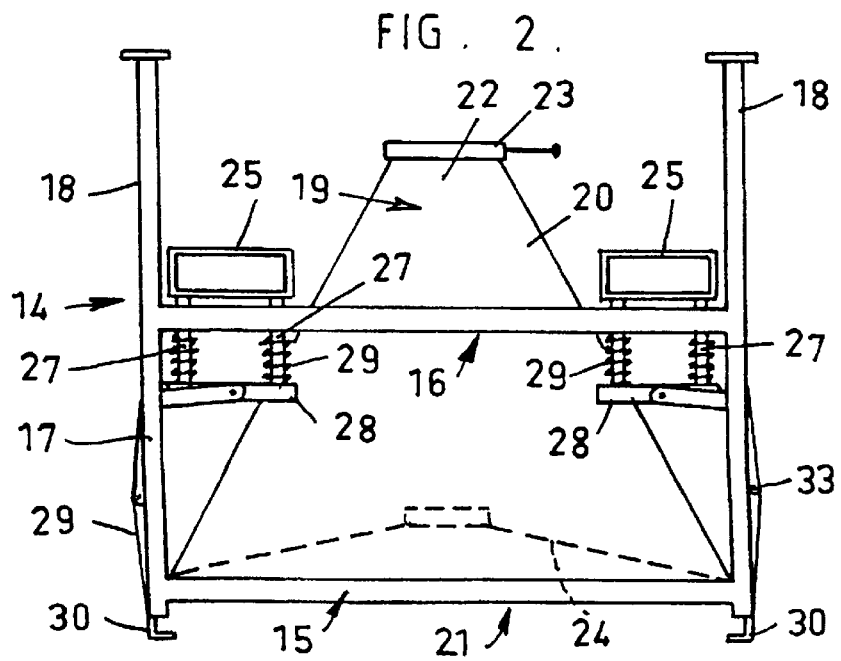
FIG. 2 is a schematic end view of a hood according to the invention.
Figure 3:
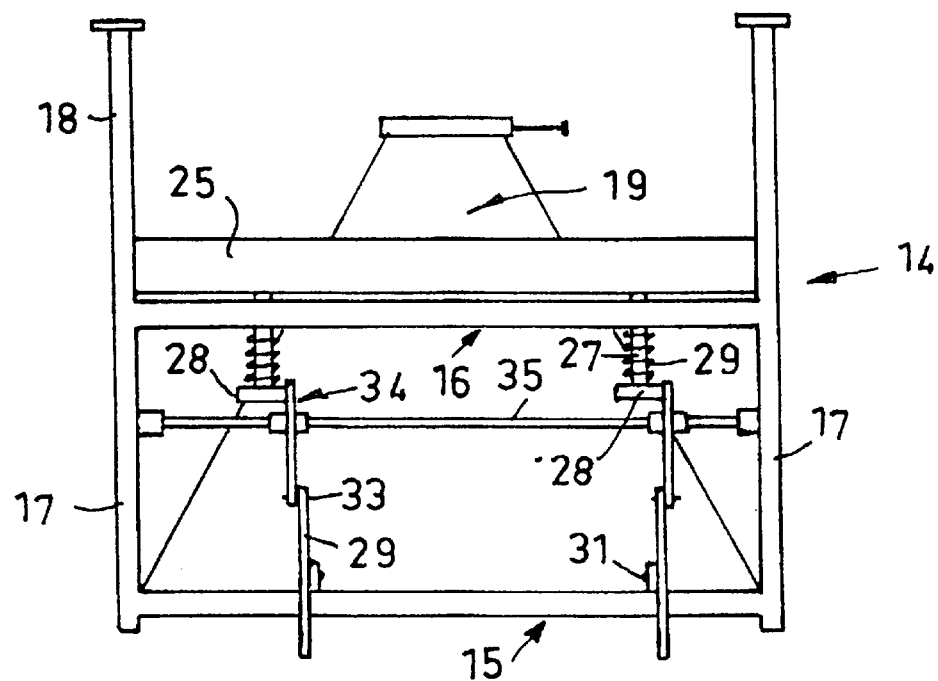
FIG. 3 is a schematic side view of the hood of FIG. 2.

The hood 14 of FIG. 2 comprises a four sided ring frame 15 spaced from a four sided bracing frame 16 joined by four corner posts 17 having leg forming extensions 18. The ring frame 15 provides a seating end for the hood and is adapted in shape and size to sit on the top edges of the four sides of a container at the open end of a container of the general type illustrated in FIG. 1. In use, a sealing strip or other sealing means can be placed between the ring frame 15 and the top edges of the container sides 3,4,5,6.

A chute 19, illustrated as having a body 20 which is portion of a square pyramid, is fixed at its entry end 21 to the frame 15 and has a discharge end 22 provided with a closure means and flow control means 23. The shape of the chute 19 can be varied to suit the type of material to be handled. The chute body 20 may be much shorter, as indicated in dotted lines indicated 24 in FIG. 2, to support (for example) the top of a liquid filled liner bag housed in the container 1.

Two tubes 25 (or channels) form sockets to receive the tines of a fork lift truck are mounted in underslung fashion adjacent (when the hood is supported by the legs 18) the under faces of opposed elements 26 of the bracing frame 16. The mounting is through pairs of posts 27 slidably engaged in and extending through the opposed frame elements 26. It will be understood that bearing means other than holes in the frame elements 26 may be provided for the post pairs. There is a retainer 28 on each post pair and there are compressions springs 29 on the posts 27 between the retainer 28 and an upper faces of the frame elements 26 thereby drawing the tubes 25 against the under faces of the frame elements 26.

A latching means is provided on the hood whereby the hood 14 can be coupled to a container 1. The latching means comprises a pair of arms 29 at opposed sides of the hood frame, the arms 29 at first ends are provided with hooks 30 which extend below the ring frame 15. As illustrated in FIG. 2 each arm 29 is pitovally connected to a bracket 31 fixed to opposed members 32 of the frame 15.

The other ends of the arms 29 are pivotally connected at 33 to first ends of levers 34, which are fixed to a shaft 35 pivotally connected at its ends to the frame corner posts 17. The other ends of the levers 34 are coupled to the retainers 28.

From a review of FIG. 2 it will be clear that the springs 29, by drawing the tubes 25 into contact with the frame elements 26, also bias the latching means to the latching condition where the hooks 30 will engage with the top rails 8 of a container of the FIG. 1 type. The hooks 30 can be varied to suit the container construction and in some cases may engage with container components other than top rails of container sides. It is to be understood that the hooks 30 are illustrative only and they may be replaced by other forms of latching element adapted to co-operate with a container with which the hood 14 is to be used.

Figure 4:
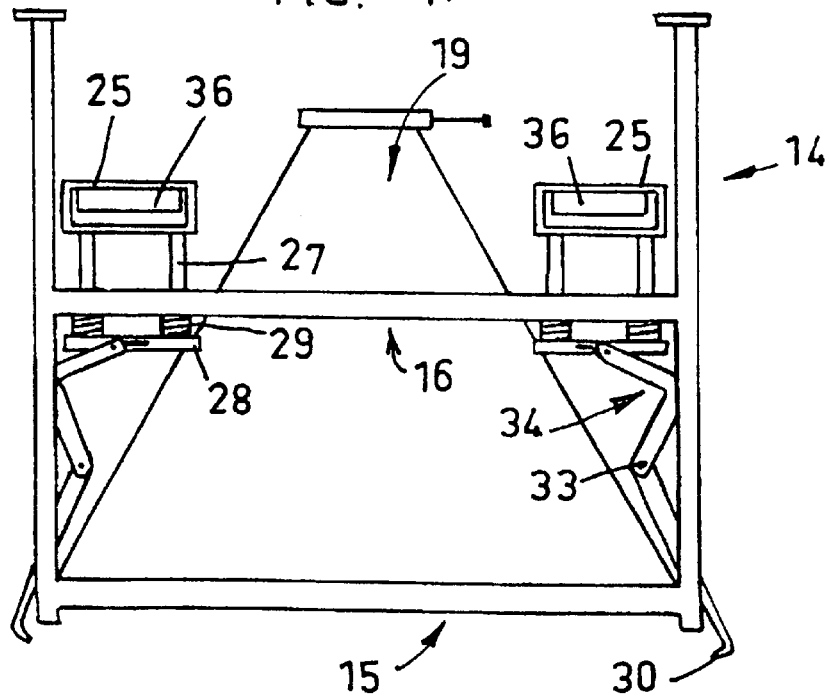
FIG. 4 is a view similar to FIG. 2 with the hood lifted to place the latching means on the hood is a release condition.
Figure 5:
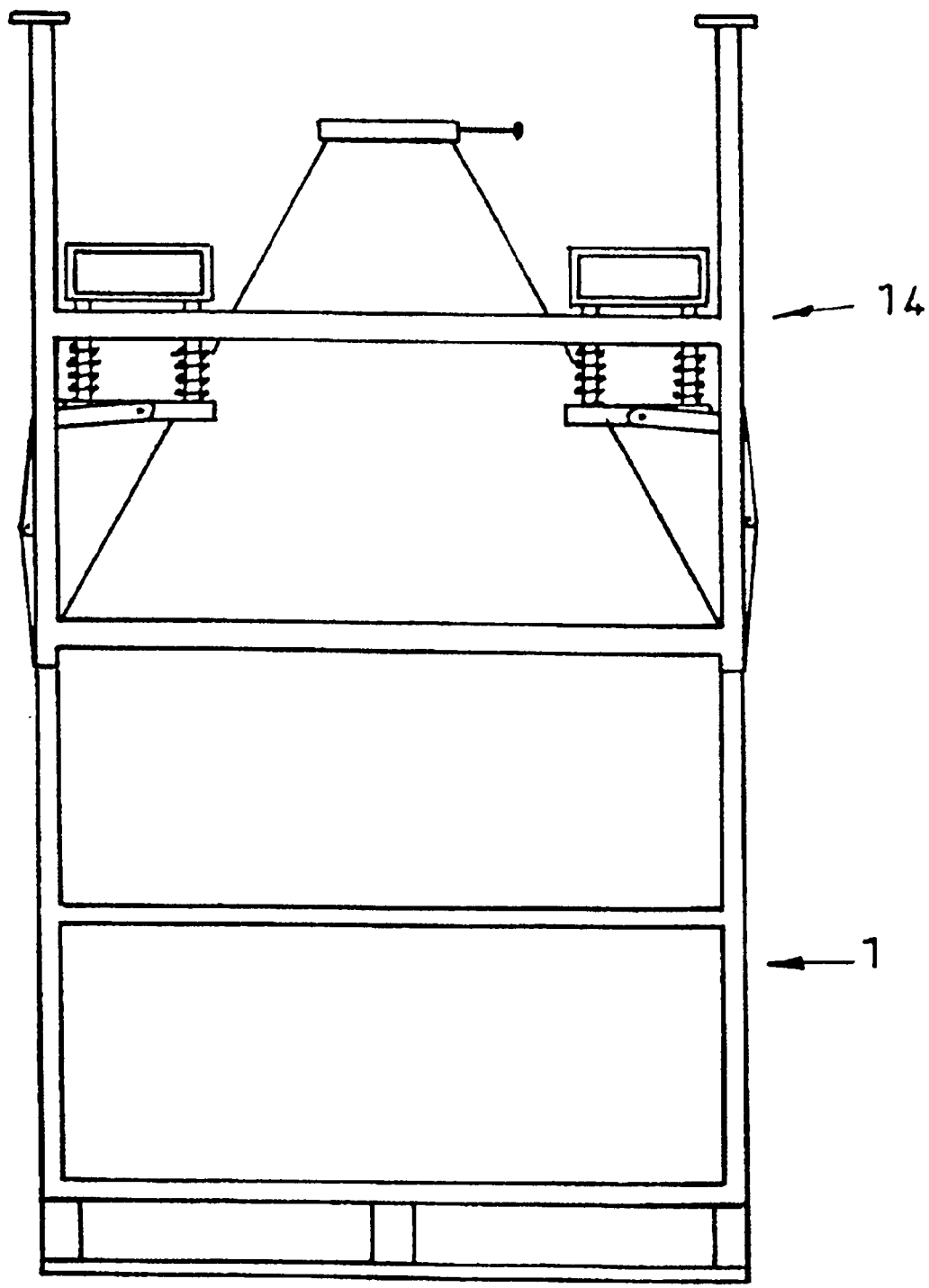
FIG. 5 is a schematic view of the hood of FIG. 2 mounted on a container and FIG. 6 is a schematic view of the container and hood of FIG. 5 inverted ready for the discharge of the container contents through the hood chute.

When the hood 14 it to be raised for positioning on a container, fork lift tines, indicated 36 in FIG. 4, would be inserted in the tubes 25 and an upward lifting force would be applied. This causes the springs 29 to compress due to the weight of the hood 14 and when the springs 29 are fully compressed the lifting force will be applied through the retainers 28 and the compressed springs 29 to the support frame 16 and the hood 14 will be lifted. At the same time the levers 34 will pivot and move the hooks 30 to a release condition as shown in FIG. 4. The hood 14 would then be aligned with the top of a container 1 and lowered onto the container. The frame 15 would come to rest on the upper edges of the container sides 3,4,5,6 and as the fork lift tines 36 are lowered the linkages moving the hooks 30 would positively cause the hooks 30 of the arms 29 to engage under the top rails 8 of opposed sides of the container 1, or in some other way engage the container 1. The latched condition of the linkage is maintained by the action of the springs 29. This is the arrangement shown in FIG. 5.

Figure 6:
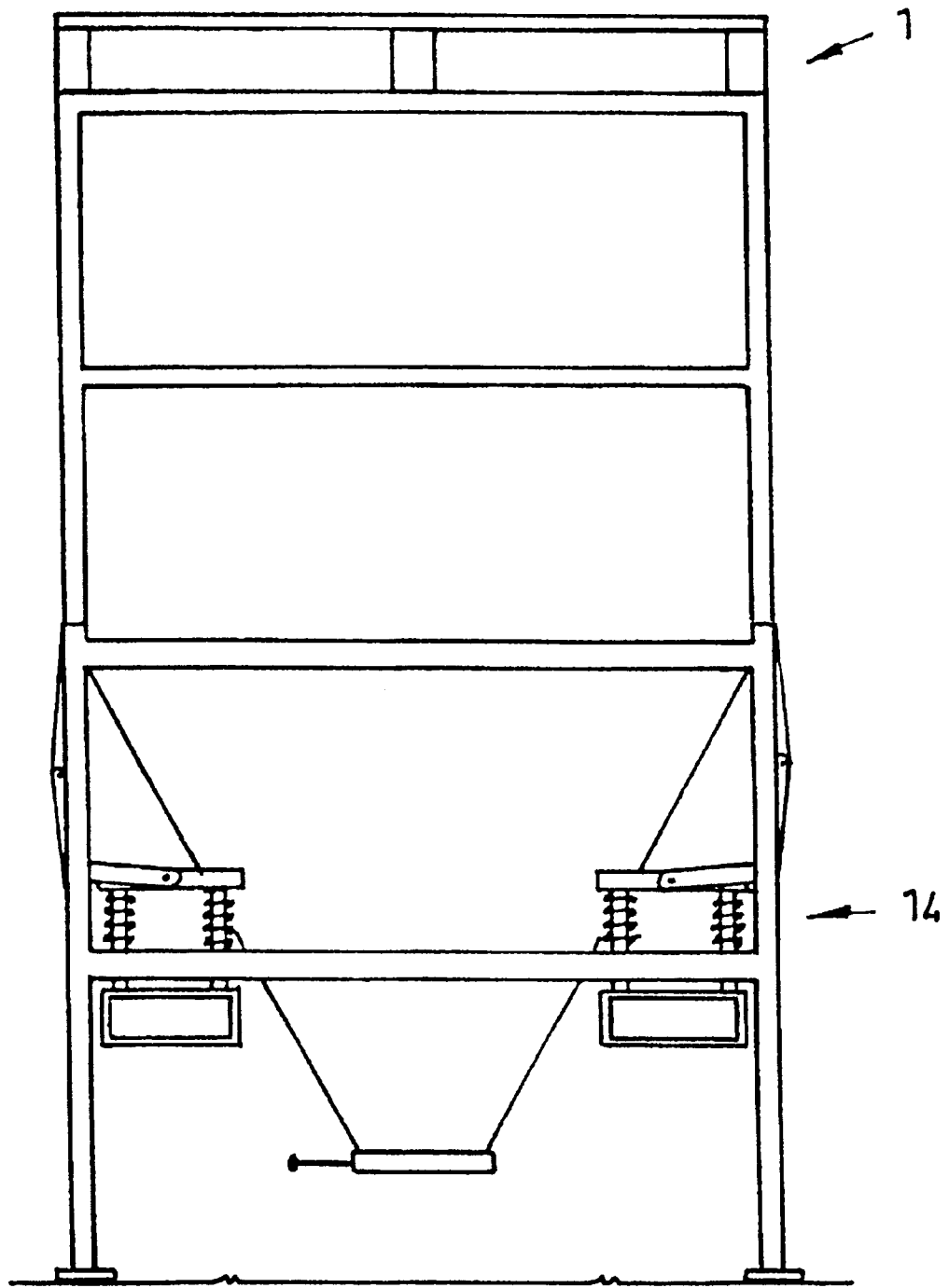

The next step is to invert the container/hood assembly to the FIG. 6 condition. This is done by inverting equipment into which the container/hood assembly is placed by means of a fork lift truck engaging the pallet type container base 2. The inverting equipment is not illustrated as it is not part of this invention but is covered by other patent applications by the present applicant.

I claim:

1. A hood for a container having four sides, a base and an open top; the hood comprising a four sided frame with a seating end to sit on top edges of the four sides of a container at the open top of the container, legs on the frame extend away from the seating end of the frame, a discharge chute having an entry end and a smaller discharge end with the chute ends separated by a tapered chute body, the chute entry end being fixed to the hood frame adjacent the frame seating end and the chute body extends away from the frame seating end in the same direction as the frame legs, socket means on the hood frame for receiving hood lifting means, said socket means being movable towards and away from the frame seating end between a working position and a rest position where the rest position is closer to said frame seating end than is said working position, latching means on the hood frame connected by linkage to the socket means, biassing means for the latching means, the latching means being movable between a latching condition for coupling the hood to a container and a release condition and is biassed by said biassing means to the latching condition, the latching condition and the release condition of the latching means respectively corresponding with the rest position and the working position of said socket means.

2. A hood as claimed in claim 1 wherein said socket means are provided with posts slidably engaged in members of said frame of said hood where they are held captive by retainers.

3. A hood as claimed in claim 2 wherein said biassing means comprises compression springs engaged with said posts, said springs being located between said retainers and the frame members in which the posts are engaged.

4. A hood as claimed in claim 1 wherein said latching means includes arms pivotally connected intermediate hook ends and coupling ends of said arms to said hood frame, the hook ends of the arms are adapted to engage co-operating means provided on a container to be fitted with said hood, the coupling ends of the arms are pivotally coupled to first ends of transfer levers which are pivotally coupled at second ends to said sockets, the transfer levers are pivotally connected intermediate their first and second ends to said hood frame, movement of said sockets being thereby transferred to said arms.

5. A hood as claimed in claim 1 wherein the seating end of said hood frame is provided with sealing means.

6. A hood as claimed in claim 1 wherein the discharge end of the hood chute is provided with a closure means able to prevent and control the rate of discharge through said discharge end.

7. A hood for a container of the type having four sides, a base and an open top, said hood comprising:

a frame having a seating end for engaging sides of a container;

legs on said frame extending away from the seating end of said frame;

a discharge chute having an entry end and a smaller discharge end separated by a tapered chute body, the entry end of said discharge chute being fixed to said frame adjacent the seating end of said frame, the tapered chute body extending away from the seating end of said frame in the same direction as the legs of said frame;

coupling members pivotally mounted on said frame for coupling said hood to the container;

receivers mounted on said frame for limiting linear movement towards and away from the seating end of said frame;

means for resiliently biassing linear movement of said receivers toward the seating end of said frame;

hood lifting means being engaged with said receivers; and, links connecting said receivers to said coupling members, with movement of said receivers in a direction away from the seating end of said frame by said hood lifting means engaged with said receivers being transferred through said links to said coupling members for pivoting the coupling members from a container coupling position to a container release position.

8. The hood for a container as claimed in claim 7, further comprising bearings on said frame and posts on said receivers, wherein said receivers are guided in their movement by said posts which are slidable in the bearings of said frame.

9. The hood for a container as claimed in claim 8, further comprising travel limiters on the posts, wherein said bearings are disposed between said receivers and the travel limiters.

10. The hood for a container as claimed in claim 9, wherein said means for resiliently biassing linear movement applied to said receivers is by at least one compression spring on the posts disposed between the travel limiters on the posts and said bearings.

11. The hood for a container as claimed in claim 7, wherein each of said coupling members includes a hook for engaging a cooperating hook socket on the container.

12. The hood for a container as claimed in claim 7, further comprising a seal at the seating end of said frame.

13. The hood for a container as claimed in claim 7, further comprising discharge control means at the discharge end of said discharge chute.

\* \* \* \* \*